Figure 1:
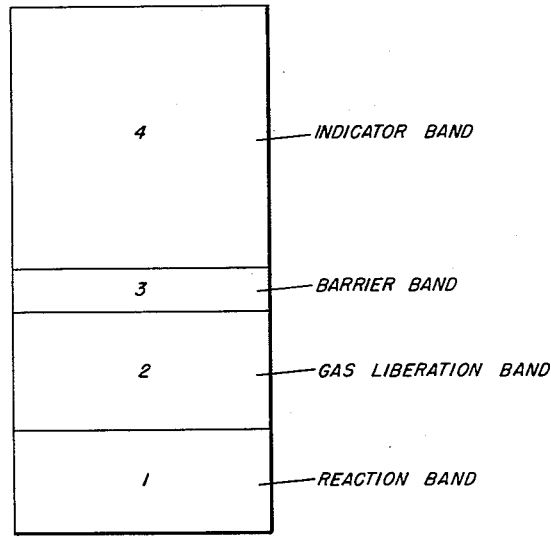

Dec. 5, 1961

M. E. DEUTSCH 3,011,874

INDICATOR STRIP AND METHOD OF TESTING

Filed Jan. 25, 1960

INVENTOR.
MARSHALL E. DEUTSCH

BY Albert H. Graddis

ATTORNEY

United States Patent Office 3,011,874
Patented Dec. 5, 1961

3,011,874
INDICATOR STRIP AND METHOD OF TESTING
Marshall E. Deutsch, Whippany, N.J.
Filed Jan. 25, 1960, Ser. No. 4,566
14 Claims. (Cl. 23—253)

This invention relates to a new and novel indicator strip suitable for biochemical reactions which involve determination of certain substances in body fluids and also relates to a method of using the strip in the analysis of body fluids.

Analysis of body fluids such as blood, urine and the like, has long been used as a diagnostic tool to determine the levels of substances produced by biochemical reactions whose presence or absence, to a greater or lesser degree, is indicative of an abnormal condition. Certain primary biochemical substances can be detected directly by comparatively simple colorimetric tests. Others can only be determined by a secondary reaction which comprises treating the body fluid with various reagent systems and then measuring one or more of the reaction products formed.

Certain of the latter substances such as urea nitrogen, trypsin, and histidine may be determined by suitable chemical reactions in which gaseous reaction products are formed and measured. For example, urea nitrogen in serum may be determined by a conversion of the urea nitrogen to ammonia and the measurement of the ammonia evolved. The measurement of the urea nitrogen level is an important diagnostic procedure since elevated levels of serum urea nitrogen are observed in patients who are suffering from uremia, chronic nephritis, severe hemorrhage or small intestinal obstruction. Again, the enzyme trypsin level in serum becomes elevated in diseases of the pancreas and the serum level of this enzyme may be determined by measuring its effect in the reaction which involves the hydrolysis of α-benzoyl-L-arginine amide hydrochloride which liberates ammonia. Histidine levels can be determined in urine by a reaction causing the liberation of ammonia in the presence of the histidine deaminase enzyme or by the liberation of carbon dioxide in the presence of the histidine α-decarboxylase enzyme. Abnormal histidine levels are indicative of pregnancy.

In all of the above mentioned tests, the amount of the gas which is liberated by the secondary reaction must be determined in order to measure the concentration of the primary biochemical substance in the test body fluid. In the analytical methods heretofore available, it has been necessary to absorb the gas formed by the secondary reaction in an absorbent solution and then determine the concentration in the solution by titration or other means. The complex nature of this analytical method has required that it be carried out by skilled laboratory technicians. Also, the test procedure is by its very nature time consuming.

It is an object of this invention to provide a test indicator for the rapid and simple quantitative determination of biochemical substances in body fluids which can undergo a chemical reaction to form a measurable gas.

It is a further object of this invention to provide a method of measuring the amount of biochemical substances in body fluids which can be carried out by unskilled personnel.

Other objects and the advantages of this invention will appear hereinafter.

The aforesaid objects are fulfilled in accordance with this invention by a strip of paper or other bibulous material which is impregnated in such a way as to provide the chemical reagent system required to carry out the desired chemical reaction of the biochemical substance to be measured to evolve a gas and, in addition, is provided with an indicator sensitive to the gas evolved in the course of the chemical reaction which produces a color change to a degree proportional to the amount of the biochemical substance in the test body fluid. Use of the indicator strip in accordance with this invention involves merely inserting the strip in a tube containing a small measured volume of the body fluid to be tested, and then comparing the area of the paper impregnated with the indicator with a standard color chart after a definite time interval. It will be apparent therefore that the use of the indicator strip of the present invention eliminates the complex analytical methods of the test procedure heretofore available for measuring the amount in a test body fluid of a biochemical substance through its chemical reaction to form a gas. The elimination of these complex and time consuming procedures of the methods of the prior art means that the test can be carried out by unskilled personnel. In addition, no laboratory equipment is needed except a simple test tube with the result that many individual tests can be carried out simultaneously.

Figure 2:
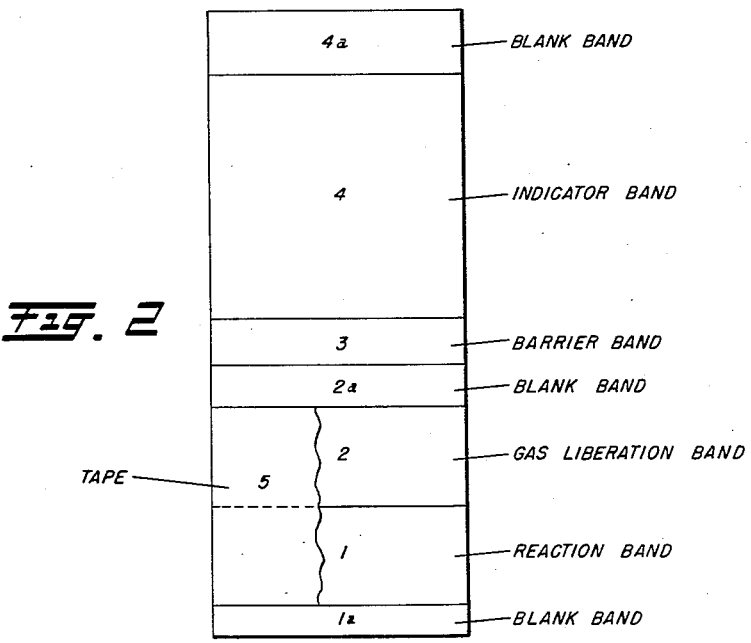

FIGS. 1 and 2 illustrate the construction of indicator strips in accordance with two embodiments of this invention.

With reference to the drawing, the indicator strip comprises a reaction band 1, at one end of the strip and extending the width thereof. The strip in the area occupied by the reaction band is impregnated with a chemical reagent system which undergoes the desired chemical reaction with the biochemical substance whose presence in the test body fluid is to be measured. The system is so designed as to ultimately liberate a gas as described hereinafter. Adjacent to the reaction band is a gas liberation band extending the width of the strip. The strip in the area occupied by the gas liberation band is impregnated with a chemical substance to release from solution the gas formed by the chemical reaction taking place in the reaction band. A barrier band 3 is provided extending the width of the strip. The strip in the area occupied by the barrier band is uniformly impregnated with a resinous material which seals the pores within the strip to prevent any migration of the body fluid being tested, thereby insuring that any color change in the indicator is due solely to gas evolved in the reaction. Adjacent to the barrier band is an indicator band 4 extending the width of the strip. The strip in the area occupied by the indicator band is uniformly impregnated with a substance adapted to neutralize the gas evolved and with an indicator which changes color within the pH range reached in the neutralization reaction. The area of the indicator band which changes color is proportional to the amount of gas formed by the reaction.

The reaction, gas liberation, barrier and indicator bands are common to the embodiments of this invention in both FIGS. 1 and 2.

In the structure illustrated in FIG. 2, certain areas of the strip are unimpregnated to form blank bands 1a, 2a, and 4a. Also, in the embodiment illustrated in FIG. 2, layers of pressure sensitive tape 5, shown partially cut away in FIG. 2, are provided to cover both sides of the strip in the areas occupied by the reaction and gas liberation bands.

A more complete discussion of the construction and function of the various bands on indicator strips prepared in accordance with the present invention, as exemplified by the embodiments illustrated in FIGS. 1 and 2, will appear hereinafter.

The stock comprising the strip is formed of a bibulous material, that is, any porous, absorbent sheet material which is insoluble in water or organic solvents, can absorb and hold liquids applied to it, has satisfactory wet strength and is non-reactive in the presence of the various reagents applied to it or the body fluids to be tested. Paper is a highly effective bibulous material for use in the invention. It can be of any thickness with a range of 0.2 to 1 millimeter being effective. The strip should have a length and width sufficient to permit impregnation of the various reagents in bands and yet be small enough to fit into small test tubes during use. A strip having a length of about 2½ to 4 inches and a width of about ⅛ to ½ inch is effective. In giving the dimensions of the various bands on the strip throughout the specification and claims, the term "length" is used for the dimension in a direction parallel to the long dimension of the strip.

The strip is impregnated with a series of different materials to form parallel bands adjacent to one another as shown in FIG. 1 or separated from each other along the length of the strip by unimpregnated areas, as shown in FIG. 2. The reaction band is located adjacent to one end of the strip or separated therefrom by a blank or unimpregnated band as shown by blank band 1a in FIG. 2. The reaction band is uniformly impregnated with a reactant system which when contacted with a body fluid reacts with a material in the fluid to produce a gas. The reaction system includes the specific reactant and a buffer adapted to maintain the pH at the optimum value for the reaction in question.

In the determination of serum urea nitrogen, the reaction band is impregnated with urease and a buffer adapted to maintain the pH of the band between 7 and 8 and preferably at about 7.6 when contacted with serum. This pH range is the optimum for activity of the urease enzyme upon urea nitrogen to form ammonia. A phosphate buffer, for example a mixture of $K_2HPO_4$ and $KH_2PO_4$ is particularly effective in obtaining the desired pH of about 7.6 in the reaction band. The amount of the reactant and buffer in the reaction band of an indicator strip in accordance with this invention may be varied over wide limits, provided the reaction band contains at least an excess of the reactant system.

The reaction band may, of course, be impregnated with other reactants in the case of the determination of materials other than urea nitrogen in body fluids. For the measurement of serum trypsin, the reaction band is impregnated with α-benzoyl-L-arginine amide hydrochloride. For the determination of histidine, the reaction band is impregnated with histidine α-decarboxylase and a buffer adapted to maintain the pH during the test between about 4 and about 5, or with histidine deaminase and a buffer adapted to maintain the pH during the test between about 7.5 and about 8.5.

The length of the reaction band may be varied and a range of from about ⅜ to ⅝ of an inch is effective.

In the embodiment illustrated in FIG. 2, a blank of unimpregnated band 1a is located at the end of the indicator strip adjacent to the reaction band. This blank band is particularly useful when the reaction and gas liberation areas are covered with pressure sensitive tape as shown in FIG. 2. The blank band 1a affords a controlled area for liquid absorption into the strip from the fluid being tested. The liquid migrates from the blank band by capillary action into the reaction band. The blank band normally has a length of ⅛ to ⅜ inch.

When impregnating the strip to form the reaction band, a solution of the reagent system is employed. For example, in preparing indicator strips for use in determining serum urea nitrogen, the area of the strip which is to form the reaction band is impregnated with a solution of urease and buffer in a suitable solvent. Water or mixtures of water with volatile organic solvents, such as ethanol, can be used. Preferably, the solvent should contain as much volatile organic solvent as possible to facilitate the drying of the strip after impregnation. Commercial urease preparations may be used as a source of urease enzyme or urease extracts can be freshly prepared by extracting such natural sources of the enzyme as soy bean meal or jack bean meal with aqueous alcohol.

The gas liberation band is located on the strip adjacent to the reaction band, and is uniformly impregnated with a material adapted to release from solution the gas formed by chemical reaction between the biochemical substance in the test body fluid and the reagent system in the reaction band. The reaction taking place in the reaction band occurs in the liquid phase, since the reaction band becomes saturated with the test body fluid through migration of the liquid up the strip by capillary action. The gas formed by the chemical reaction is initially dissolved in the liquid phase with which the reaction band is saturated. In order to provide an accurate measurement of the amount of the biochemical substance in the test body fluid it is apparent that the gas formed by the reaction taking place in the reaction band must be completely released from solution. This is particularly true because the amount of gas formed is extremely small. The pH in the reaction band for carrying out the reaction with the biochemical substance is frequently such that at least a portion of the gas formed will tend to remain in solution.

For example, in the determination of urea nitrogen in serum, the reaction band is buffered to provide a pH between about 7 and 8. Under such slightly alkaline conditions at least a portion of the ammonia formed in the reaction will remain in solution.

The material used to impregnate the strip to form the gas liberation band is designed to provide a pH in the gas liberation band at a value adapted to insure complete release from solution of the gas formed by the reaction. In the case of indicator strips in accordance with this invention in which ammonia is liberated in the reaction band, the gas liberation band should be impregnated with a basic material to produce a pH of at least 10 within the gas liberation band when wet. A pH range of 10 to 11 is preferred. When the reagent system in the reaction band reacts with the biochemical substance in the test body fluid to form carbon dioxide, the gas liberation band should be impregnated with an acidic material adapted to produce a pH of less than 4 in the gas liberation band when wet.

When the test is carried out utilizing an indicator strip in accordance with this invention, the test body fluid moves by capillary action up the strip, first contacting the reaction band where the reaction occurs and a gas is formed. This gas is initially dissolved in the liquid with which the strip is saturated during the test. The liquid containing the gas formed by the reaction continues to move up the strip by capillary action into the gas liberation band. In the gas liberation band, due to the presence of the material with which the band is impregnated, the pH of the liquid changes to a value which insures complete release of the gas from the solution. The gas liberation band in indicator strips in accordance with this invention provides for an accurate measurement of the amount of the biochemical substance in the test body fluid, since it insures complete release from solution of the gas formed by the reaction.

The acidic or basic material used should be non-hygroscopic or non-deliquescent, non-volatile, water soluble and be free from any creeping tendencies or destructive effects upon the bibulous material of the strip. Suitable basic materials include the alkali metal carbonates, phosphates, and acetates such as potassium phosphate, lithium carbonate, sodium carbonate, potassium carbonate, sodium acetate, potassium acetate, sodium phosphate and the like. Potassium carbonate is a particularly effective basic material for use in the gas liberation band in strips prepared for the measurement of urea nitrogen in serum or other materials which under the test conditions liberate ammonia. Suitable acidic materials for use in the gas liberation band when carbon dioxide is liberated under the test conditions include benzoic acid, lactic acid, fumaric acid, salicylic acid, sulfosalicylic acid, tartaric acid, oxalic acid and the like.

The amount of acidic or basic material to be used must be sufficient to insure that effective gas liberation will occur throughout the test period, and must be sufficient to overcome any basicity or acidity in the body fluid being tested which migrates by capillary action up the strip. In the case of indicator strips for measuring urea nitrogen in 0.1 to 0.2 ml. of serum, the presence of between about 0.05 to 1.0 mg. of potassium carbonate is particularly effective.

The length of the gas liberation band is normally the same as that of the reaction band, that is, between about 3/8 and 5/8 inch.

The gas liberation band is impregnated in a manner similar to that described in connection with impregnation of the reaction band. The acidic or basic material, in water or preferably a mixture of water and volatile organic solvent is applied to the strip in the area to be occupied by the gas liberation band and the strip is then dried to remove solvent.

In accordance with the embodiment of the present invention illustrated in FIG. 2, the reaction and gas liberation bands are covered on both surfaces of the strip with sealing tape, such as pressure sensitive paper tape. The use of tape is particularly desirable for several reasons. First, it serves to stiffen the strip at the region where it become wet with the body fluid being tested. Without the use of the tape, the strip has a tendency to collapse against the sides of the tube in which the test is carried out, with the possibility that by capillary action the body fluid may not only by-pass the reaction area but may wet the indicator area, thus yielding erroneous results. Second, the presence of the gas impermeable tape permits the liberation of all the gas from the upper portion of the gas liberation band, as close as possible to the indicator band, thereby improving accuracy and reproducibility of results. Finally, the tape protects the urease enzyme in the reaction band from contact with air during storage of the strip and insures a long useful shelf life of the strip.

The barrier band is located on the strip adjacent to the gas liberation band or separated therefrom by a blank band 2a as shown in FIG. 2. The purpose of the barrier band in the indicator strip in accordance with this invention is to prevent the migration of liquid by capillary action up the strip. The presence of an effective barrier will insure that any color change in the indicator band is due solely to the gas liberated from the gas liberation band and not due to the acidity or alkalinity of any of the reagents in other bands in the strip. Any of the conventional paper impregnants which are adapted to prevent capillary flow of liquid through paper can be used in creating an effective barrier band in the indicator strip in accordance with this invention. The impregnant used should be inert, that is chemically stable, and tenaciously held in the bibulous material of the strip. For example, the strip in the area forming the barrier band can be impregnated with such materials as paint, varnish, enamels, plastic compositions, and the like. Useful plastic compositions include polymers and copolymers of vinyl chloride, vinyl acetate, acrylic acid and its esters, methylacrylic acid and its esters and the like. Polymerized methyl methylacrylate has been found to be a particularly effective plastic for use in creating a barrier band in the indicator strip of the present invention. The length of the barrier band must be sufficient to insure no migration of liquid therethrough into the indicator band and yet should be sufficiently short so that the gas evolved from the gas liberation band has only a short distance to travel before contacting the indicator band. A length of between 1/16" and 1/4" is preferred.

In accordance with the embodiment of the present invention illustrated in FIG. 2, wherein the reaction and gas liberation bands are covered with plastic tape, it is desirable to provide a controlled area for release of gas from the upper edge of the gas liberation band.

In the creation of the barrier band the impregnating material is applied to the strip in the area to be occupied by the barrier band. To insure satisfactory viscosity for impregnation the impregnants are conventionally applied as solutions in volatile solvents and, after impregnation, the strip is allowed to dry to insure complete evaporation of solvents. In the case of impregnants such as paints and varnishes, the strip can be subjected to heat during the drying operation to accelerate cure of the impregnant.

The indicator strip in accordance with the invention is provided with an indicator band adjacent to the barrier band. The function of the indicator band is to absorb the gas liberated from the gas liberation band and to provide a means for measuring its quantity. The area of the strip occupied by the indicator band is uniformly impregnated with a substance adapted to neutralize the gas evolved (an acidic substance where ammonia is liberated, a basic substance where carbon dioxide is liberated) and an indicator adapted to change color at or before the endpoint of the neutralization. The indicator used must exhibit an easily observable color change within the pH range reached during the neutralization reaction which takes place in the strip. This reaction occurs under essentially dry conditions, since the only moisture present is the equilibrium moisture content of the paper which is normally within the range of about 5 to 10 percent by weight.

In the case of indicator strips wherein the gas evolved is ammonia (as in the measurement of serum urea nitrogen) acidic substances which are useful neutralizing agents in the indicator band include such acids as citric acid, oxalic acid, maleic acid, benzoic acid, sulfosalicylic acid, tartaric acid and the like. The pH range of the indicator used to denote the end-point of the neutralization reaction is critical. The indicator must be completely in the acid form in the presence of the acidic substance present in the indicator band. In addition, the indicator must be completely in its basic form at a pH no higher than that at which ammonia is no longer absorbed into the indicator band. It has been found that there is no absorption of ammonia into paper impregnated with an acidic substance at a pH above about 6.5. Thus the indicator should be in its basic form at a pH of 6.5 or less. Useful indicators, therefore, include brom thymol blue, alizarin red S, brom phenol blue, brom cresol purple, brom cresol green, methyl red and the like. Where the indicator band is impregnated with a relatively strong acid, such as sulfosalicylic acid, an indicator such as brom phenol blue is generally preferred, since it changes color over a pH range of 3 to 4.6. With a weaker acid, such as citric acid, a more basic indicator such as brom cresol purple, which changes color over a pH range of 5.2 to 6.7 is satisfactory. Brom cresol green is a preferred indicator and an indicator strip where the indicator band is impregnated with tartaric acid and brom cresol green is particularly effective for the measurement of serum urea nitrogen.

In the case of indicator strips wherein the gas evolved is carbon dioxide, the indicator band is impregnated with a basic substance adapted to neutralize the evolved carbon dioxide and an indicator. Useful basic substances include alkali metal carbonates, phosphates and acetates such as potassium phosphate, lithium carbonate, sodium carbonate, potassium carbonate, sodium acetate, potassium acetate, sodium phosphate and the like. The indicator must be completely in its basic form in the presence of the basic substance present in the indicator band and must be fully converted to its acid form at a pH no lower than that at which carbon dioxide is no longer absorbed into the indicator band. Useful indicators include phenolphthalein, thymolphthalein, thymol blue, metacresol purple and the like.

The indicator band is formed by contacting the strip in the area to be occupied by the indicator band with a solution in a volatile solvent of the acidic or basic substance and the indicator, after which the strip is dried.

Since the gas evolved from the gas liberation band is actually titrated in the indicator band, it is apparent that the sensitivity of the indicator strip may be readily varied by adjusting the quantity of the acidic or basic substance applied to the indicator band. For indicator strips of high sensitivity, only a small amount of acidic or basic substance is present in the indicator band, whereas for strips adapted to measure larger quantities of the biochemical substance in the body fluid, a larger amount of acidic or basic substance is used. The quantity of acidic or basic substance applied in forming the indicator band is adjusted by varying the concentration of the impregnating solution or the volume applied to the strip or both.

The color change which is observed in the indicator band is proportional to the amount of gas evolved from the gas liberation band which in turn is proportional to the amount of the biochemical substance in the body fluid being tested. With a low concentration of the biochemical substance, the indicator band changes color over only a small proportion of its length, whereas with progressively larger concentrations, correspondingly larger proportions of the length of the indicator band exhibit a color change. Thus, the indicator strip of this invention provides means for accurately measuring the amount of the biochemical substance in the body fluid being tested.

In accordance with the embodiment of the present invention illustrated in FIG. 2, a blank or unimpregnated band 4a is provided above the indicator band at the upper portion of the strip. This is desirable in providing an area wherein the indicator strip can be held without the possibility of any contamination of the indicator band from substances on the hands of the technician carrying out the test. The blank band 4a should preferably have a length of at least ½ inch.

In preparing indicator strips in accordance with the present invention, a sheet of bibulous material, such as paper, having a width equal to the length of the finished strip can be impregnated in the proper areas with the various reagent systems required to produce the bands in the finished strip and the sheet is dried to remove all volatile solvents present in the impregnating solutions. In the impregnation, care must be taken to insure that there is no overlapping of the various reagent systems applied. After drying, the sheet is then cut transversely into narrow strips which can then be dried in desiccators and packaged in boxes, stoppered test tubes or other convenient containers.

In using the indicator strips prepared in accordance with the present invention a small amount of the body fluid to be tested, for example about 0.1 to 0.2 ml., is placed in a small test tube which has a depth at least slightly in excess of the length of the indicator strip. One strip is then inserted in the tube with the reaction band towards the bottom and the reaction is allowed to proceed for a controlled length of time. At the conclusion of the test period the height of the color developed in the indicator band is compared with a standard color chart which has previously been prepared by performing the test with a known amount of the material to be tested for. Since the reaction produces a gas it is particularly important that the test be carried out away from any air currents which might disperse the gas and prevent it from contacting the indicator band of the strip.

The following examples illustrating the preparation of indicator strips for use in the measurement of serum urea nitrogen is presented to illustrate more thoroughly the present invention.

*Example I*

A sheet of Whatman 3 MM paper, 4 inches wide, 12 inches long and 0.4 mm. thick is selected for making indicator strips useful in the measurement of urea nitrogen in serum. One of the 12 inch sides is designated as the reference edge.

A bead of methyl methacrylate resin solution (Krylon clear coating #150, Krylon, Inc., Norristown, Pa.) is applied to the sheet to impregnate the paper in a band ⅛ inch wide, located 1½ to 1⅝ inches from the reference edge. The sheet is allowed to dry in still air to remove all solvent from the impregnated band (barrier band). An amount sufficient to saturate the paper is applied.

A urease extract, buffered to pH 7.6, is prepared as follows:

616 mg. $K_2HPO_4$, 63.2 mg. $KH_2PO_4$ and 0.1 ml. acetate buffer (prepared by mixing 15 grams sodium acetate with 1 ml. glacial acetic acid and diluting to 100 ml. with water) is dissolved in water and diluted to 7 ml. final volume. The volume is brought to 10 ml. by the addition of 95 percent ethyl alcohol. 3 grams jack bean meal is added and the mixture is shaken for 15 minutes at room temperature. The yellowish-greenish creamy liquid is centrifuged under a force of 1000 g. at 0° C. for 1 hour to yield a translucent yellow buffered urease extract.

The extract is applied to impregnate the sheet in a ½ inch wide band, from ¼ to ¾ inch from the reference edge. The sheet is allowed to dry in still air at room temperature. A quantity of about 0.5 ml. extract is required.

A solution of 0.05 N potassium carbonate in 70 percent ethyl alcohol is then applied to impregnate the sheet in a ½ inch wide band, from ¾ to 1¼ inches from the reference edge. The sheet is again allowed to dry at room temperature in still air. A quantity of 0.48 ml. solution is required.

Paper tape ("Scotch" tape No. 267, yellow, Minnesota Mining and Manufacturing Co.), 1 inch wide is applied with a rubber roller over the strip from ¼ to 1¼ inches from the reference edge.

The width of the sheet is then reduced to 3¼ inches by cutting that distance from the reference edge.

A solution of 0.1 percent by weight Brom Cresol Purple in 0.008 M citric acid in 95 percent ethyl alcohol is applied in a band ½ inch wide from 1⅝ to 2⅛ inches from the reference edge. The sheet is allowed to dry in still air. A quantity of about 0.5 ml. solution is required. The sheet is then cut perpendicularly to the reference edge into 48 strips, each 3¼ inches long and ¼ inch wide. The strips are packed in Pyrex test tubes, dried in a desiccator and the tubes stoppered.

*Example II*

A long sheet of Whatman 3 MM paper, 3¼ inches wide and 0.4 millimeter thick is used as the stock for making indicator strips for the measurement of serum urea nitrogen. One of the long edges of the paper is designated as the reference edge.

A buffered urease extract, prepared as described in Example I, is applied to impregnate the sheet in a ½ inch wide band, occupying the distance from ¼ inch to ¾ inch from the reference edge. A quantity of 0.5 ml. extract is applied per foot of paper.

A solution of 4.5 percent potassium carbonate by weight in 50 percent ethyl alcohol is then applied to the sheet in a band ½ inch wide extending from ¾ inch to 1¼ inches from the reference edge. A quantity of 0.5 ml. of the solution is applied per foot of paper. The sheet is dried at room temperature in still air to evaporate the solvents present in the urease extract and potassium carbonate solutions. The impregnated portions of the sheet are then covered on both sides of the sheet with a 1 inch wide strip of paper tape ("Scotch" tape No. 267, yellow, Minnesota Mining and Manufacturing Co.). The paper tape thus covers the sheet in a band from ¼ inch to 1¼ inches from the reference edge.

A solution of polymerized methyl methacrylate resin (Krylon clear coating #150, Krylon, Inc., Norristown, Pa. 2 parts—ethyl alcohol 1 part) is applied in an amount sufficient to saturate the paper in a ⅛ inch wide band extending from 1½ inches to 1⅝ inches from the reference edge.

A solution containing 0.2 percent brom cresol green by weight and 0.6 percent tartaric acid by weight in 95 percent ethyl alcohol is then applied in a ½ inch wide band extending from 1⅝ inches to 2⅛ inches from the reference edge. A quantity of 0.5 ml. solution per foot of paper is required. The sheet is then allowed to dry in still air to evaporate the solvents present in the resin and tartaric acid-brom cresol green solutions. The sheet is then cut perpendicularly to the reference edge into a series of strips each 3¼ inches long and ¼ inch wide. The resulting indicator strips are packaged in test tubes, dried in a desiccator and the tubes are stoppered.

The indicator strips prepared in accordance with the examples have the following characteristics, with reference to FIG. 2:

| Reference Character | Description | Dist. from Ref. Edge (in.) | Length of Band (in.) |
| --- | --- | --- | --- |
| 1a | Blank Band | 0–¼ | ¼ |
| 1 | Reaction Band [1] | ¼–¾ | ½ |
| 2 | Gas Liberation Band [1] | ¾–1¼ | ½ |
| 2a | Blank Band | 1¼–1⅜ | ⅛ |
| 3 | Barrier Band | 1⅜–1⅝ | ¼ |
| 4 | Indicator Band | 1⅝–2⅛ | ½ |
| 4a | Blank Band | 2⅛–3¼ | 1⅛ |

[1] Bands covered with paper tape (reference character 5).

Indicator strips prepared as described above are useful in quantitative determination of urea nitrogen present in 0.1 to 0.2 ml. of human serum. The accuracy of the test utilizing these strips is ±3 mg. urea N in 100 grams serum where serum urea nitrogen levels are in the range of 10 to 60 mg./100 ml. serum.

In measuring the amount of urea nitrogen present in serum utilizing an indicator strip prepared as described in the foregoing examples, 0.1 ml. of serum is placed in a small test tube. The tube should have a total length at least in excess of that of the indicator strip which, as in the example, has a length of 3¼ inches. The strip is inserted into the test tube containing the serum in such a way that the blank band 1a contacts the serum. The test tube is then stoppered, placed in a vertical position, and after 30 minutes the appearance of the indicator band is compared with a standard color chart which has been prepared by carrying out the test with serum containing varying amounts of urea nitrogen.

As soon as the blank band 1a contacts the serum in the test tube, the serum begins to migrate up the strip by capillary action and into the reaction band. The buffered urease in the reaction band reacts with urea nitrogen present in the serum to form ammonia. In the presence of the phosphate buffer, the pH in the wet reaction band is 7.6. Under these conditions an appreciable portion of the ammonia formed by the chemical reaction of urease with urea nitrogen is dissolved in the liquid which wets the reaction band. Migration of liquid up the strip continues by capillary action carrying liquid containing dissolved ammonia into the gas liberation band. The potassium carbonate present in the gas liberation band dissolves in the liquid which wets the gas liberation band, causing the pH to rise rapidly to 10 or higher. Under these basic conditions the dissolved ammonia is liberated as a gas which emerges from the upper portion of the gas liberation band, that is, at the upper end of the paper tape which covers both the reaction and gas liberation bands. The liberated gaseous ammonia neutralizes the acidic substance in the indicator band causing a rise in pH in the indicator band with a resulting color change in the indicator. Due to the presence of the barrier band which is impregnated with an impervious methyl methacrylate resin, capillary flow of the basic liquid present in the gas liberation band into the indicator band is impossible. Thus, any color change observed in the indicator band is due solely to the ammonia formed by the reaction of urease with urea nitrogen in the test serum.

The color change observed in the indicator band occupies increasingly larger proportions of the length of the indicator band as the serum urea nitrogen concentration increases. For example, with a thirty minute test period, an indicator strip of Example II and 0.1 ml. of serum, with a normal urea nitrogen level (10 mg. percent), the indicator band shows a blue coloration extending up about 10 percent of the length of the indicator band. At 30 mg. percent, a blue band extends up about 30 percent of the length of the indicator band. At 75 mg. percent, the entire indicator band is blue.

At markedly elevated levels of serum urea nitrogen, which may be as high as 900 mg. percent in conditions of uremia, a sharp color change over the entire length of the indicator band will occur less than two minutes after the serum reaches the gas liberation band. This renders an indicator strip prepared in accordance with this invention extremely valuable in surgery near the bladder. Indicator strips in accordance with this invention are also useful in the mass screening of population groups where former methods have proved far too complex.

This application is a continuation-in-part of my copending application, Serial No. 799,388, filed March 13, 1959, now abandoned.

It is understood that the foregoing detailed description is given merely by way of illustration and that many variations may be made therein without departing from the spirit of my invention.

Having described my invention, what I desire to secure by Letters Patent is:

1. A test indicator for quantitatively determining the amount of a biochemical substance in a body fluid which comprises a strip of bibulous material impregnated with a plurality of reagent systems in bands extending the width of said strip, said bands comprising a first reaction band at one end of said strip uniformly impregnated with a reagent system adapted to undergo a reaction with said biochemical substance to form a gas, a second band adjacent to said first reaction band uniformly impregnated with a material adapted to release said gas from solution, a third band adjacent to said second band uniformly impregnated with an inert impregnant adapted to prevent capillary flow through said third band and a fourth band adjacent to said third band uniformly impregnated with an indicator adapted to change color to a degree proportional to the amount of said gas formed by said reaction.

2. A test indicator for quantitatively determining the amount of a biochemical substance in a body fluid which comprises a strip of bibulous material impregnated with a plurality of reagent systems in bands extending the width of said strip, said bands comprising a first reaction band spaced from one end of said strip by a narrow unimpregnated band, said first reaction band being uniformly impregnated with a reagent system adapted to undergo a reaction with said biochemical substance to form a gas, a second band adjacent to said first reaction band uniformly impregnated with a material adapted to release said gas from solution, a third band spaced from said second band by a narrow unimpregnated band, said third band being uniformly impregnated with an inert impregnant adapted to prevent capillary flow through said third band and a fourth band adjacent to said third band spaced from the opposite end of said strip by an unimpregnated band, said fourth band being uniformly impregnated with an indicator adapted to change color to a degree proportional to the amount of said gas formed by said reaction.

3. A test indicator according to claim 2 wherein the portions of said strip occupied by said first and said second bands are covered on both sides of said strip with adherent layers of pressure sensitive tape.

4. A test indicator for quantitatively determining the amount of a biochemical substance in a body fluid which comprises a strip of bibulous material impregnated with a plurality of reagent systems in bands extending the width of said strip, said bands comprising a first reaction band at one end of said strip uniformly impregnated with a reagent system adapted to undergo a reaction with said biochemical substance to form ammonia, a second band adjacent to said first reaction band uniformly impregnated with a basic material adapted to release said ammonia from solution, a third band adjacent to said second band uniformly impregnated with an inert impregnant adapted to preven capillary flow through said third band and a fourth band adjacent to said third band uniformly impregnated with an acidic substance adapted to neutralize said ammonia and an indicator adapted to change color within the pH range reached during the neutralization reaction to a degree proportional to the amount of said ammonia formed by said reaction.

5. A test indicator for quantitatively determining the amount of a biochemical substance in a body fluid which comprises a strip of bibulous material impregnated with a plurality of reagent systems in bands extending the width of said strip, said bands comprising a first reaction band at one end of said strip uniformly impregnated with a reagent system adapted to undergo a reaction with said biochemical substance to form carbon dioxide, a second band adjacent to said first reaction band uniformly impregnated with an acidic material adapted to release said carbon dioxide from solution, a third band adjacent to said second band uniformly impregnated with an inert impregnant adapted to prevent capillary flow through said third band and a fourth band adjacent to said third band uniformly impregnated with a basic substance adapted to neutralize said carbon dioxide and an indicator adapted to change color within the pH range reached during the neutralization reaction to a degree proportional to the amount of said carbon dioxide formed by said reaction.

6. A test indicator for quantitatively determining the amount of urea nitrogen in a body fluid which comprises a strip of bibulous material impregnated with a plurality of reagent systems in bands extending the width of said strip, said bands comprising a first reaction band at one end of said strip uniformly impregnated with a reagent system adapted to react with said urea nitrogen to form ammonia, said reagent system comprising urease and a buffer adapted to maintain the pH within said first reaction band between about 7 and about 8 when wet with said fluid, a second band adjacent to said first reaction band uniformly impregnated with a basic material adapted to maintain the pH within said second band of at least 10 when wet with said fluid to release said ammonia from solution, a third band adjacent to said second band uniformly impregnated with an inert impregnant adapted to prevent capillary flow through said third band and a fourth band adjacent to said third band uniformly impregnated with an acidic substance adapted to neutralize said ammonia and an indicator adapted to change color within the pH range reached during the neutralization reaction and below a pH of about 6.5 to a degree proportional to the amount of said ammonia formed by said reaction.

7. A test indicator according to claim 6 wherein said reaction band is separated from one end of said strip by a narrow unimpregnated band, said second band is separated from said third band by a narrow unimpregnated band and said fourth band is separated from the opposite end of said strip by a narrow unimpregnated band.

8. A test indicator according to claim 7 wherein said first and said second bands are covered on both sides of said strip by adherent layers of pressure sensitive tape.

9. A test indicator for quantitatively determining the amount of urea nitrogen in a body fluid which comprises a narrow strip of a bibulous material impregnated with a plurality of reagent systems in bands extending the width of said strip, said bands comprising a first reaction band separated from one end of said strip by an unimpregnated band, said first reaction band being uniformly impregnated with urease and a phosphate buffer adapted to maintain the pH within said first reaction band at about 7.6 when wet with said fluid, said urease and said buffer forming a reagent system adapted to undergo a reaction with said urea nitrogen in said body fluid to form ammonia, a second band adjacent to said reaction band, said second band being uniformly impregnated with about 0.05 to 1 milligram of an alkali metal carbonate to maintain the pH within said second band from about 10 to about 11 when wet with said fluid to release said ammonia from solution, a third band separated from said second band by an unimpregnated band, said third band being uniformly impregnated with an inert impregnant adapted to prevent capillary flow of said fluid through said third band and a fourth band adjacent to said third band and separated from the opposite end of said strip by an unimpregnated band, said fourth band being uniformly impregnated with an acidic substance adapted to neutralize said ammonia and an indicator adapted to change color within the pH range reached during the neutralization reaction and below a pH of about 6.5 to a degree proportional to the amount of ammonia formed by said reaction.

10. A test indicator according to claim 9 wherein said first and said second bands are covered on both sides of said strip by adherent layers of pressure sensitive tape.

11. A test indicator according to claim 10 wherein said acidic substance is citric acid and said indicator is brom cresol purple.

12. A test indicator according to claim 10 wherein said acidic substance is tartaric acid and said indicator is brom cresol green.

13. A test indicator according to claim 10 wherein said acidic substance is sulfosalicylic acid and said indicator is brom phenol blue.

14. A test indicator according to claim 10 wherein said first reaction band has a length of about 3/8 inch to about 5/8 inch and is separated from one end of said strip by an unimpregnated band having a length of about 1/8 inch to about 3/8 inch, said second band has a length of about 3/8 inch to about 5/8 inch, said third band has a length of about 1/16 inch to about 1/4 inch and is separated from said second band by an unimpregnated band having a length of about 1/8 inch to about 3/8 inch and said fourth band has a length of about 3/8 inch to about 5/8 inch and is separated from the opposite end of said strip by a distance of at least 1/2 inch.

References Cited in the file of this patent

UNITED STATES PATENTS

| | | |
|---|---|---|
| 2,105,226 | Pratt | Jan. 11, 1938 |
| 2,129,754 | Yagoda | Sept. 13, 1938 |
| 2,167,304 | Kloz | July 25, 1939 |
| 2,249,867 | Snelling | July 22, 1949 |
| 2,848,308 | Free | Aug. 19, 1958 |

OTHER REFERENCES

Hawk Practical Phys. Chem. 13th Ed., pages 549–551.